B. Lauth.
Straightening Metal Bars, &c.
Nº 41,306. Patented Jan. 19, 1864.
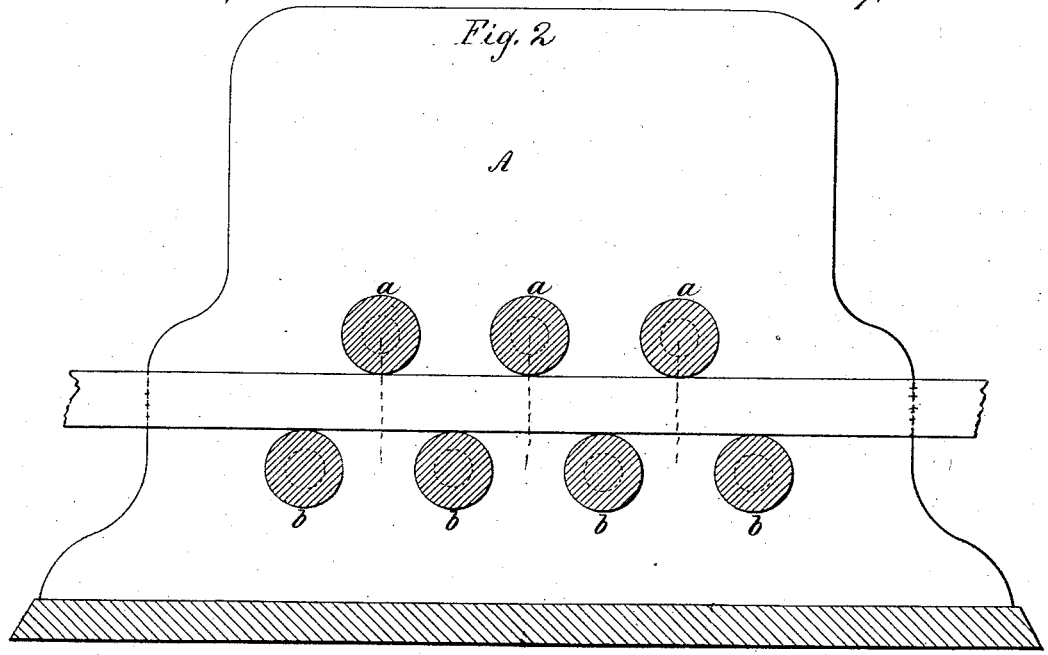
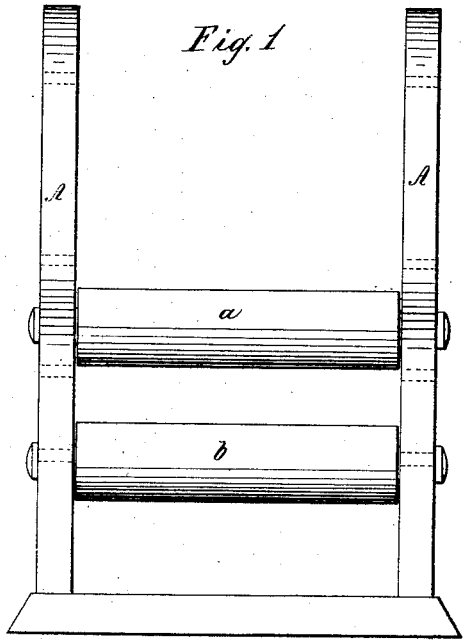
Witnesses:
P. E. Wilson
J. D. Patton
Inventor
Bernard Lauth
By atty A. B. Stoughton

UNITED STATES PATENT OFFICE.

BERNARD LAUTH, OF BUCHANAN, PENNSYLVANIA.

IMPROVED MACHINE FOR STRAIGHTENING METAL BARS, RAILS, TUBES, &c.

Specification forming part of Letters Patent No. 41,306, dated January 19, 1864.

*To all whom it may concern:*

Be it known that I, BERNARD LAUTH, of Buchanan, in the county of Allegheny and State of Pennsylvania, have invented certain new and useful improvements in machinery or apparatus for straightening metal bars, rails, rods, tubes, plates, and other similar articles; and I do hereby declare that the following is a full, clear, and exact description of the same, reference being had to the accompanying drawings, making a part of this specification, in which—

Figure 1 represents an end view, and Fig. 2 represents a longitudinal vertical section through the apparatus or machine.

My invention consists in the combination of two or more pairs of top rollers with two or more pairs of bottom rollers, the centers of the top rollers being placed between the centers of the bottom rollers.

To enable others skilled in the art to make and use my invention, I will proceed to describe the same with reference to the drawings.

The top rollers are shown at *a* and the bottom rollers at *b*, the centers of the top rollers (as shown by the red lines extending therefrom) being placed between the centers of the bottom rollers. The journals of all the rollers work in suitable bearings in the frame-work A. A bottom roller at each end of the series may be turned by gearing in the direction of the passage of the bar, rail, plate, or other article, to carry it through, and at the front of the machine there may be gripping or nipping rollers to advance the article to be straightened, and at the rear of the machine another pair of similar rollers to deliver it from the machine.

The rollers may be either grooved, flat, or of any other form, according to the kind of article to be straightened, and the positions of their bearings may be regulated by screws or otherwise, either acted upon separately or simultaneously. For straightening round, square, or other-shaped bars, rails, or tubes, the rollers are grooved or shaped according to the form of the article to be straightened.

The rollers, frame-work, and gearing may be made of any required strength, and the rollers are placed at any suitable distance apart, and any number of rolls may be used in the train.

By passing a rail, bar, or any other article through between such a series of rollers all the bends or sinuosities are rolled out and the articles come out perfectly straightened.

Having thus fully described the nature, object, and purpose of my invention, what I claim, in a machine for straightening bars, rails, rods, tubes, plates, and other articles of metal, is—

The employment of a double set of rollers, the centers of one set being placed between the centers of the other set, substantially in the manner and for the purpose herein set forth.

BERNARD LAUTH.

Witnesses:
JOHN C. STEVENSON,
DANIEL BERG,
A. B. STEVENSON.